United States Patent
Reed

(10) Patent No.: US 11,112,051 B2
(45) Date of Patent: Sep. 7, 2021

(54) FLARED-END AUTOMOTIVE ENGINE COOLANT PIPE REPAIR STENT AND METHOD FOR REPAIRING AN ENGINE

(71) Applicant: Mark Jefferson Reed, Tucson, AZ (US)

(72) Inventor: Mark Jefferson Reed, Tucson, AZ (US)

(*) Notice: Subject to any disclaimer, the term of this patent is extended or adjusted under 35 U.S.C. 154(b) by 219 days.

(21) Appl. No.: 16/257,912

(22) Filed: Jan. 25, 2019

(65) Prior Publication Data
US 2019/0153928 A1 May 23, 2019

Related U.S. Application Data

(60) Continuation-in-part of application No. 16/004,829, filed on Jun. 11, 2018, now Pat. No. 10,240,513, which is a division of application No. 14/965,268, filed on Dec. 10, 2015, now abandoned, which is a continuation-in-part of application No. 14/515,467, filed on Oct. 15, 2014, now abandoned.

(60) Provisional application No. 61/891,113, filed on Oct. 15, 2013.

(51) Int. Cl.
| | | |
|---|---|---|
| F16L 55/165 | (2006.01) | |
| F01P 11/04 | (2006.01) | |
| F16L 55/163 | (2006.01) | |
| B23P 6/04 | (2006.01) | |

(52) U.S. Cl.
CPC .......... *F16L 55/1657* (2013.01); *F01P 11/04* (2013.01); *F16L 55/163* (2013.01); *B23P 6/04* (2013.01); *Y10T 29/49233* (2015.01); *Y10T 29/49352* (2015.01); *Y10T 29/49721* (2015.01); *Y10T 29/49732* (2015.01); *Y10T 29/49734* (2015.01); *Y10T 29/49746* (2015.01)

(58) Field of Classification Search
CPC .... F16L 41/004; F16L 55/163; F16L 55/1657
USPC ...... 138/97; 285/15–17, 148.23, 148.27, 417
See application file for complete search history.

(56) References Cited

U.S. PATENT DOCUMENTS

| | | | |
|---|---|---|---|
| 690,778 A | * | 1/1902 | Schroth .................... F23J 13/04 126/314 |
| 1,347,381 A | | 7/1920 | Jones |

(Continued)

OTHER PUBLICATIONS

"Bimmer Pipe" downloaded from <http://www.bimmerpipe.com> on Dec. 9, 2015, 3 pages (pp. 1-3 in pdf).

(Continued)

*Primary Examiner* — Kenneth Rinehart
*Assistant Examiner* — Richard K. Durden
(74) *Attorney, Agent, or Firm* — Mitch Harris, Atty at Law, LLC; Andrew M. Harris

(57) ABSTRACT

A repair kit and associated method for repairing an automotive coolant pipe for fluid-conducting within an engine block of an engine includes at least a repair stent with a flared end, sealant and instructions for performing the method. The method includes draining coolant from the engine, removing the water pump from the engine without removing the timing chain cover of the engine, inserting the repair stent including a sealant through the coolant passage, wherein the coolant passage extends through the timing chain cover into the engine, re-assembling the water pump to the engine and adding coolant to the engine.

18 Claims, 20 Drawing Sheets

(56) References Cited

U.S. PATENT DOCUMENTS

| | | | | |
|---|---|---|---|---|
| 2,157,107 | A * | 5/1939 | Bay | F28F 19/002 |
| | | | | 285/213 |
| 2,225,615 | A * | 12/1940 | Bay | F28F 19/002 |
| | | | | 285/55 |
| 2,310,927 | A * | 2/1943 | Bay | F28F 19/002 |
| | | | | 285/55 |
| 2,484,904 | A * | 10/1949 | Pennella | F28F 11/02 |
| | | | | 285/213 |
| 2,620,830 | A * | 12/1952 | Schultz | F28F 19/002 |
| | | | | 138/97 |
| 3,696,447 | A * | 10/1972 | McKown | F16L 55/1657 |
| | | | | 4/390 |
| 4,135,274 | A | 1/1979 | Freeman | |
| 4,147,382 | A * | 4/1979 | Wachter | F24F 13/0209 |
| | | | | 285/189 |
| 4,536,994 | A | 8/1985 | Krebs | |
| 4,756,337 | A * | 7/1988 | Settineri | B29C 65/5042 |
| | | | | 138/99 |
| 4,941,512 | A * | 7/1990 | McParland | F16L 55/163 |
| | | | | 138/109 |
| 5,653,475 | A | 8/1997 | Scheyhing et al. | |
| 5,666,725 | A | 9/1997 | Ward | |
| 6,422,574 | B1 * | 7/2002 | Mooklar | F01P 11/04 |
| | | | | 277/608 |
| 6,647,622 | B2 | 11/2003 | Hipple et al. | |
| 6,893,183 | B2 | 5/2005 | Levison | |
| 7,069,883 | B2 | 7/2006 | Atkins | |
| 7,287,493 | B2 | 10/2007 | Buck | |
| 8,256,800 | B2 | 9/2012 | Ward | |
| 8,464,424 | B2 | 6/2013 | Christensen | |
| 9,163,761 | B2 | 10/2015 | Christensen | |
| 9,545,177 | B1 | 1/2017 | Coven | |
| 2007/0125437 | A1 * | 6/2007 | Lazzara | F16L 55/1686 |
| | | | | 138/99 |
| 2010/0000621 | A1 * | 1/2010 | Kamata | B05D 5/00 |
| | | | | 138/99 |
| 2015/0167535 | A1 | 6/2015 | Reed | |
| 2016/0097481 | A1 | 4/2016 | Reed | |
| 2018/0291799 | A1 | 10/2018 | Reed | |

OTHER PUBLICATIONS

Office Action in U.S. Appl. No. 14/515,467 dated Aug. 10, 2016, 6 pages (pp. 1-6 in pdf).
Office Action in U.S. Appl. No. 14/965,268 dated Apr. 25, 2018, 15 pages (pp. 1-15 in pdf).
AGA Tools & Products, "N62 & N62-TU Coolant Pipe" downloaded from <http://www.agatools.com/part/bmw-n62-coolant-pipe/pipe> on May 24, 2018, 3 pages (pp. 1-3 in pdf).
Notice of Allowance in U.S. Appl. No. 16/004,829 dated Oct. 24, 2018, 14 pages (pp. 1-14 in pdf).

* cited by examiner

Sanding Rod

Cleaning Rod

Sponge Applicator Brush

Repair Tube Insert (The Stent)

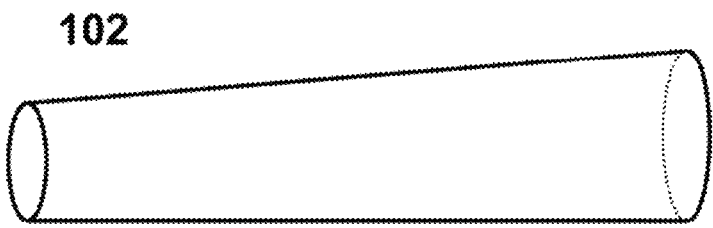
Fig. 11F
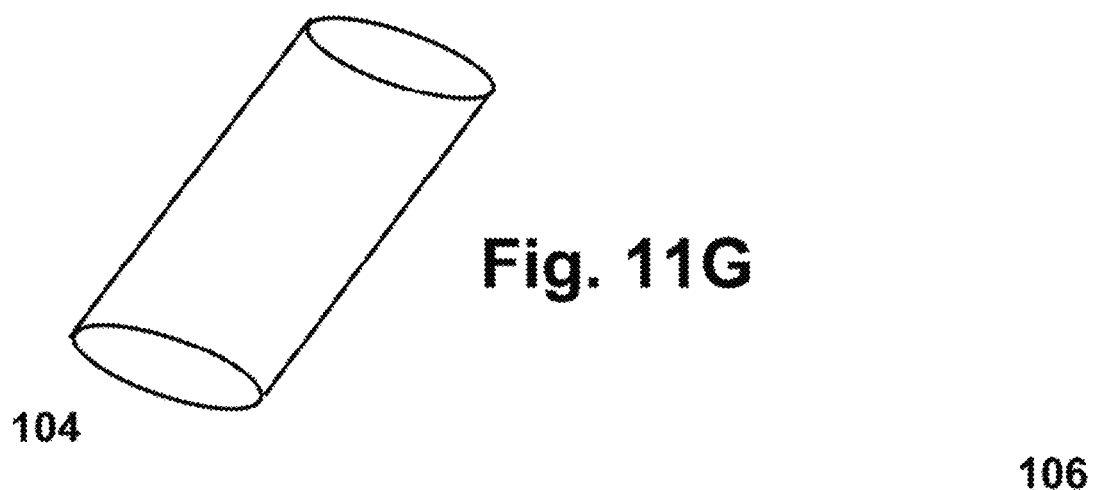
Fig. 11G
Fig. 11H
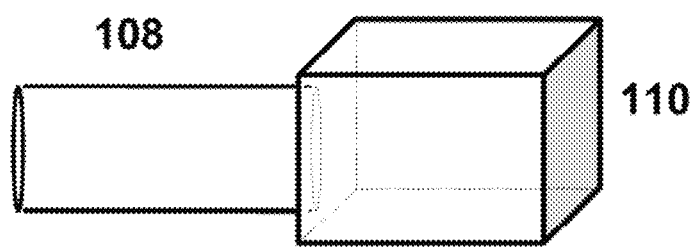
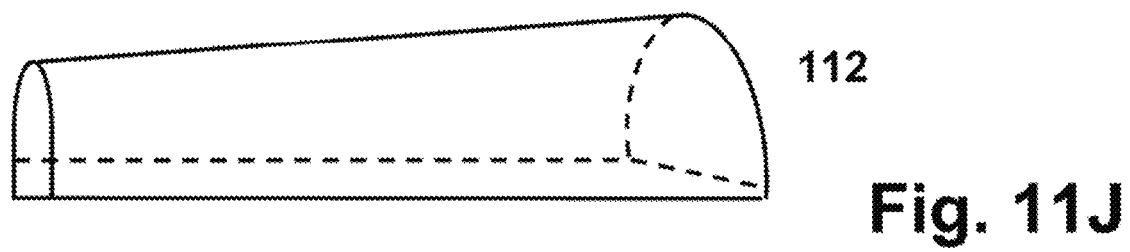
Fig. 11J

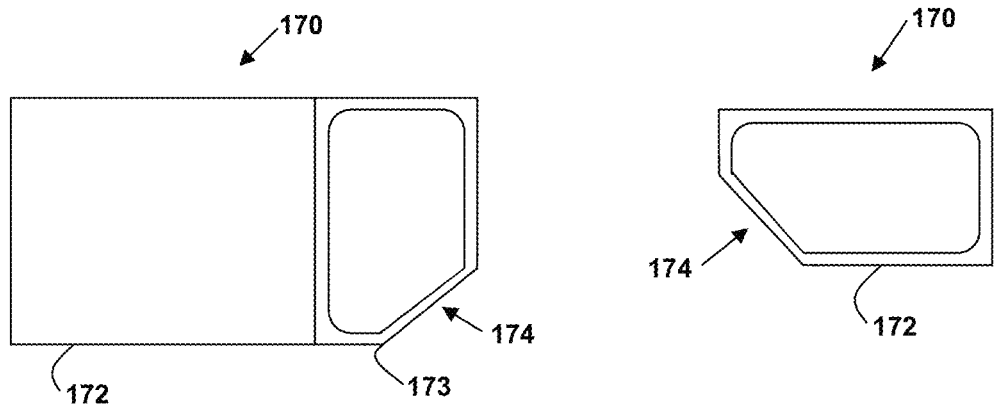
Fig. 19A
Fig. 19B
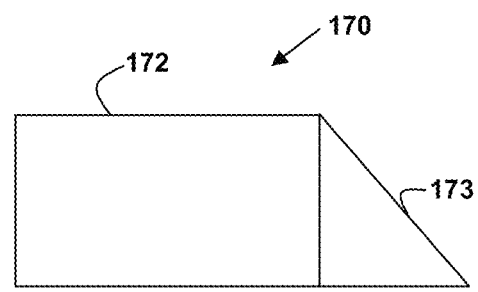
Fig. 19C

FLARED-END AUTOMOTIVE ENGINE COOLANT PIPE REPAIR STENT AND METHOD FOR REPAIRING AN ENGINE

This U.S. Patent Application is a Continuation-in-part of U.S. patent application Ser. No. 16/004,829 filed on Jun. 11, 2018, and claims priority thereto under 35 U.S.C. § 120. U.S. patent application Ser. No. 16/004,829 is a Division of U.S. patent application Ser. No. 14/965,268, filed on Dec. 10, 2015 published as U.S. Patent Application Publication No. 20160097481 on Apr. 7, 2016, and claims priority thereto under 35 U.S.C. § 121. U.S. patent application Ser. No. 14/965,268 is a Continuation-in-part of U.S. patent application Ser. No. 14/515,467 filed on Oct. 15, 2014 and published as U.S. Patent Application Publication No. 20150167535 on Jun. 18, 2015, and claims priority thereto under 35 U.S.C. § 120. U.S. patent application Ser. No. 14/515,467 claims priority under 35 U.S.C. § 119(e), and this Application claims priority to thereby, U.S. Provisional Patent Application No. 61/891,113, filed on Oct. 15, 2013. The disclosures of all of the above-referenced applications are incorporated herein by reference.

BACKGROUND OF THE INVENTION

1. Field of the Invention

The present invention relates to automotive repair methods and components, and, more particularly, to a flared-end stent and method for repairing an automotive engine cooling pipe leaking within an engine block.

2. Background of the Invention

An automotive engine cooling system plays a critical role for the continued optimum performance of the automobile engine. During the operation of an automobile, the combustion process causes a tremendous increase in the engine temperature. If not dissipated expeditiously and effectively, the excessive heat can severely damage the engine. Temperatures in the combustion chamber of the engine can reach 4,500° F. (2,500° C.). If the engine goes without cooling for very long, it can seize. When this happens, the metal would actually have gotten hot enough for the piston to weld itself to the cylinder. This usually means the complete destruction of the engine. The automotive engine cooling system handles the task of dissipating this excessive heat. An automotive engine cooling system basically consists of a radiator, a thermostat, a coolant tank, liquid coolant, a water pump, a radiator fan, and coolant transfer hoses and pipes.

In a typical fuel-powered automobile, the thermostat sits between the engine and the radiator. The function of the thermostat is to block the flow of coolant to the radiator until the engine has warmed up sufficiently. When the engine is cold, no coolant flows through the engine. Once the engine reaches its operating temperature (generally about 200 degrees F., 95 degrees C.), the thermostat opens to enable the engine to warm up as quickly as possible. The thermostat thus reduces engine wear, deposits, and emissions.

A coolant formulation is a mixture of an antifreeze and water, usually in the ratio of 1:1. The antifreeze in the coolant mixture reduces the freezing point and elevates the boiling point of the water in the mixture. The coolant is circulated throughout the engine through pipes and hoses by the water pump. The function of the coolant is to extract the excessive heat generated in the combustion chamber of the engine and transfer it to the radiator for dissipation.

Hot coolant from the engine is transferred to the radiator and cooler coolant is transfer to the engine by heavy-duty hoses. A radiator is a type of heat exchanger. The radiator is designed to transfer heat from the hot coolant that flows through it to the air blown through it by the radiator fan.

All automobiles are provided with an effective engine cooling system. Many automobile engines contain coolant transfer pipes within the engine block. However, very often, there are complaints of vehicles stalling due to engine over-heating caused by inadequate heat-dissipation, which in turn, is caused due to inadequacy or absence of coolant. Such an inadequacy or absence of coolant is invariably due to its leakage from the coolant supply pipes/hoses owing to either cracks, cuts or holes therein or wear and tear of the seals lining the outer side of the ends of these pipes/hoses at the point of joining a groove, socket or a receptacle at either end.

One example of a leaking front seal on a coolant transfer pipe can be found on the BMW V-8 N62 engine. (BMW identifies vehicles and components made by Bayerische Motoren Werke Aktiengesellschaft, aka Bavarian Motor Works.) This engine has a common problem that is very expensive to repair. This BMW N62 Engine was used from 2001 through 2010 in vehicles including the BMW 735i, 740i, 745i, 745Li, 750i, 750Li. 645Ci, 650i, 545i, 550i, the X5 SUV and more. When BMW originally built the N62 engine at the factory, the coolant transfer pipe (part no. 11 14 1 439 975) was installed through the front of the engine block, before the installation of the timing chain cover. However, once the engine is installed in the vehicle, it is very expensive to remove the timing chain cover in order to install a new, factory-made BMW Coolant Transfer Pipe through the front of the engine. This repair job is conservatively estimated to cost anywhere between USD 7000 to USD 9000, and may take about two to three weeks of time.

A second method was later developed, which involves accessing the coolant transfer pipe by removing the intake manifold. Once the intake manifold has been removed, then the existing coolant transfer pipe can be cut-out of the inside of the engine block, and a new collapsible coolant transfer pipe can be installed in place. Several companies manufacture these Collapsible Coolant Transfer Pipes. This is the most commonly-used method of repairing a leaking coolant transfer pipe because it is cheaper and faster to remove the intake manifold, than the original factory method of removing the Timing Chain Cover.

FIGS. 1 and 2 show a replacement coolant transfer pipe 10 that is marketed by All German Auto as "the expanding cooling pipe," in accordance with the disclosure in U.S. Pat. No. 8,464,424. The expanding cooling pipe is shown as being installed in an engine block 17 of a BMW automobile having an N62 engine 11. Installation of the replacement coolant transfer pipe 10 is similar to that of the installation method for the collapsible BMW coolant transfer pipe, described above. Installation of the replacement coolant transfer pipe 10 also requires the removal of the intake manifold, and then requires cutting out the old coolant transfer pipe inside the engine block before the replacement coolant transfer pipe 10 can be installed.

However, unlike the BMW coolant transfer pipe, which is a two-piece ensemble, the expanding cooling pipe 10 is a single expandable pipe. The expanding cooling pipe 10 comprises a front tube 12 having: (i) a proximal portion configured for at least partially slidably and sealably engaging a front sealing ring 14 seated within a front opening of the engine block 17, and (ii) a rear tube 16 telescopically engaged with the front tube 12 at a first end and engaged with a rear sealing ring 14A within a rear opening of engine block 17. The expanding cooling pipe 10 has a distal portion configured for at least partially slidably seating within a rear opening 18 of the engine block, whereby expansion of the cooling pipe apparatus within the engine block seats the proximal and distal portions of the front and rear tubes within the respective front and rear openings of the engine block. This feature provides sliding and rotational resistance to thereby stabilize the installation of the cooling pipe apparatus within the engine block.

Bavarian Motor Parts (BMP) markets its own in-house designed collapsible BMW coolant transfer pipe 20 (Part No. 107914) as illustrated in FIGS. 3A-3E. This is a two-piece ensemble that contains; (i) a front inner tube 22 provided with machined o-ring grooves 24 on the outer surface to be fitted with seals and (ii) a rear outer tube 26. The rear outer tube 26 has an inner diameter larger than or equal to the outer diameter of the front inner tube. The rear outer tube 26 also has a hollow protrusion 28 at one end whose outer diameter is smaller than the inner diameter of the front inner tube 22. The outer tube 26 is fitted to the inner tube 22 by rotating (in direction R) the protruding part 28 of the outer tube 26 into the inner tube 22. The fitting is packed with a nylon angled packing piece 30 to achieve a tight fit. The ends of the resultant pipe are then fitted to the corresponding receptacles 14, 18 in the engine block.

The problem with both of these methods is that the front seal on both the factory installed coolant transfer pipe 10, and the after-market collapsible transfer pipe 20 could eventually leak at the same place again after installation.

Korean Patent publication KR 100143619 of Daewoo Motor Co. LTD., illustrated in FIG. 4, discloses a pipe fitting 32 wherein a projecting part of a first pipe 34 can be inserted into a second pipe 36. The joined portion is coupled with the fitting 32 to prevent a coolant from leaking through the gap between the first pipe 34 and the second pipe 36. However, this arrangement involves a plurality of parts and is only as good as the integrity of the coupling. Compression and expansion can affect the integrity of the coupling. Also, such an arrangement cannot prevent coolant leakage at the front seal.

A GoWesty coolant pipe repair kit, illustrated in FIG. 5, provides a collection 40 of Brass fittings, screw clamps and spring clamps. However, these are suited only for repairing radiator coolant pipes located outside the engine block in Vanagons.

The present invention provides a simpler, cost-effective and timesaving solution. A repair tube insert offers a more durable method of repairing a leaking front seal on a coolant transfer pipe that is also much less expensive to install. Through the unique repair apparatus and the method of repair disclosed herein, the present invention provides an inexpensive, time saving and simple solution to correct a failure of the front seal of a coolant transfer pipe in an automotive engine, the failure causing the engine to overheat from leakage of coolant.

SUMMARY OF THE INVENTION

The present invention includes repair kits and methods of repairing and stopping the leakage of coolant at the front seal in a coolant transfer pipe in the engine block of a vehicle and the engine resulting from the repair method. The repair kit includes at least a repair stent with a cylindrical portion sized to fit within a coolant passage of the engine and a flared portion for contacting the coolant passage at an expansion of the coolant passage at a first end, and a package of coolant pipe repair sealant for affixing the repair stent within the coolant passage. The method includes draining coolant from the engine, removing the water pump from the engine without removing the timing chain cover of the engine, inserting the repair stent including a sealant through the coolant passage, wherein the coolant passage extends through the timing chain cover into the engine, re-assembling the water pump to the engine and adding coolant to the engine.

The additional features and advantages of the disclosed invention are set forth in the detailed description which follows, and will be apparent to those skilled in the art from the description or recognized by practicing the invention as described, together with the claims and appended drawings.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIGS. 11A-11H and 11J illustrate various embodiments of repair tube inserts, in accordance with the present disclosure.

FIGS. 19A-19C are a top view, an end view and a side view, respectively, of another flared stent 170 in accordance with an embodiment of the present disclosure.

DESCRIPTION OF ILLUSTRATIVE EMBODIMENT

The following detailed description is of repair methods and techniques for repairing leaks in an engine. The description is not to be taken in a limiting sense, but is made merely for the purpose of illustrating the general principles of the invention.

This disclosure reveals an apparatus and method of repairing an internal coolant leak that can develop in engines that contain coolant transfer pipes within the engine block or passages extending between the engine block and external components where coolant is conveyed. An example of a coolant transfer pipe can be found in the "N62" engine, which is made by Bavarian Motor Works (BMW). In the BMW example, the coolant transfer pipe, (BMW part no. 11-14-1-339-975) tends to develop a leak around a front seal ring that is glued to the lip of BMW's transfer pipe. Over time, this glue can fail, causing BMW's front seal ring to separate from the transfer pipe.

This defective part causes internal coolant to leak within the inside of the engine block itself, and the coolant then overflows out of the engine block through an exit small hole drilled in the engine. When the engine loses coolant, the engine will overheat and could cause major engine damage. In order to repair this problem, many hours of expensive shop labor and materials are required to remove major engine components such as the intake manifold and/or the timing cover, in order to gain access the defective Coolant Transfer Pipe and faulty Front Seal.

The disclosure shows an apparatus and method for repairing the internal engine coolant leak without the requirement or extra steps of removing the intake manifold and/or the timing cover. The repair technique disclosed herein requires only the removal of the water pump, in order to gain access to the coolant transfer pipe. Once the water pump has been removed, access to the inside of the failed coolant transfer pipe and front seal is created. This newly created access makes it possible to repair the leaking coolant transfer pipe and front seal ring by sliding a repair tube insert coated with sealant, inside the failed coolant transfer pipe and front seal.

The repair method disclosed herein provides an exceptionally durable repair as the repair method may use components of high-strength aluminum alloy similar to the alloy used for manufacturing the engine. The repair method provides a metal or rubber-liner or a liner fabricated from other suitable material, and bonds the liner to a coolant transfer and timing chain cover, using a special high-temperature coolant pipe silicon sealant. The sealant can be continuously immersed in antifreeze, and can withstand temperatures up to 500° C. The labor required to complete the disclosed repair method is usually only about one hour longer than the amount of shop time required to replace a water pump.

Figure 1:
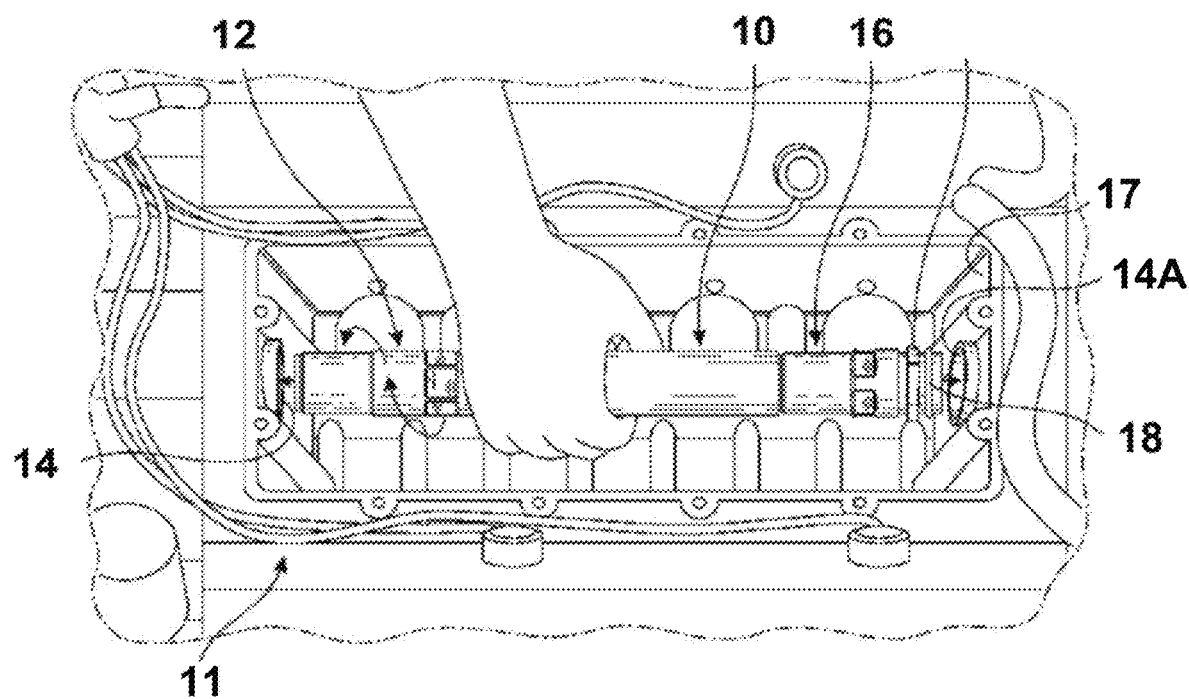
FIG. 1 is an illustration of the manner in which an expanding cooling pipe is installed in the engine block of a BMW car having an N62 engine, in accordance with the prior art.
Figure 2:
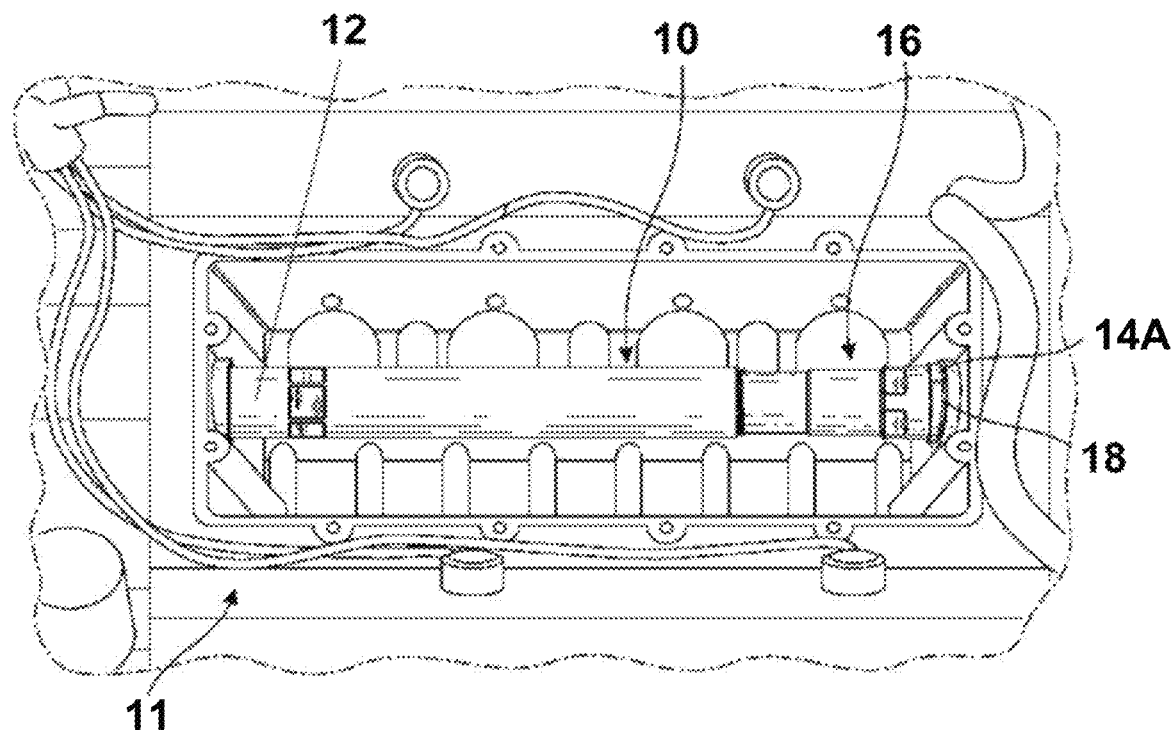
FIG. 2 shows the expanding cooling pipe of FIG. 1 installed in the engine block.
Figure 3A:
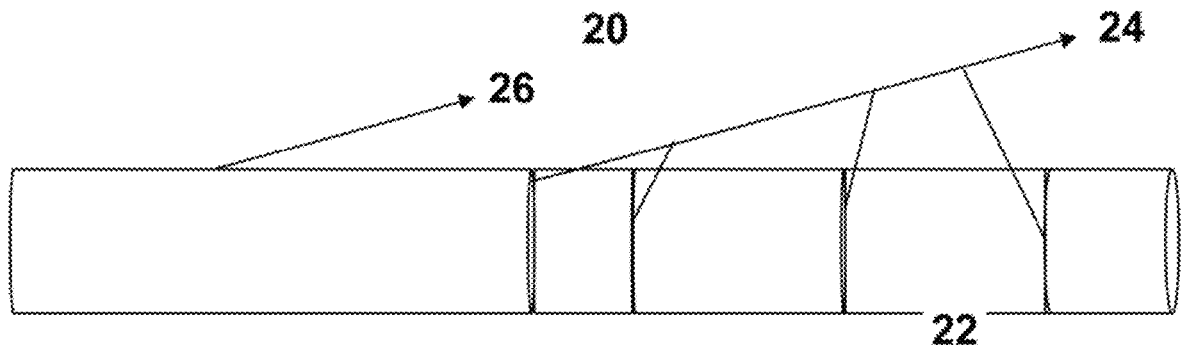
FIGS. 3A-3E illustrate components provided in a BMP Design Collapsible BMW Coolant Transfer Pipe kit, in accordance with the prior art.
Figure 3B:
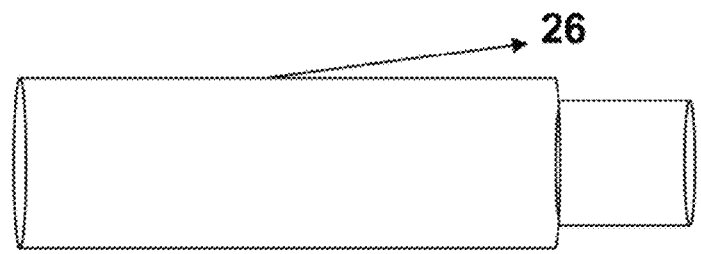
Figure 3C:
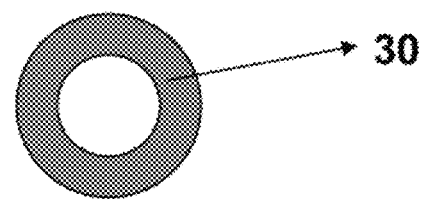
Figure 3D:
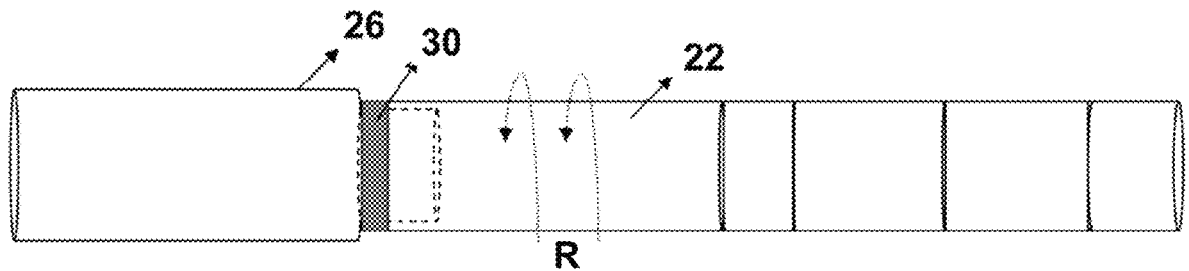
Figure 3E:
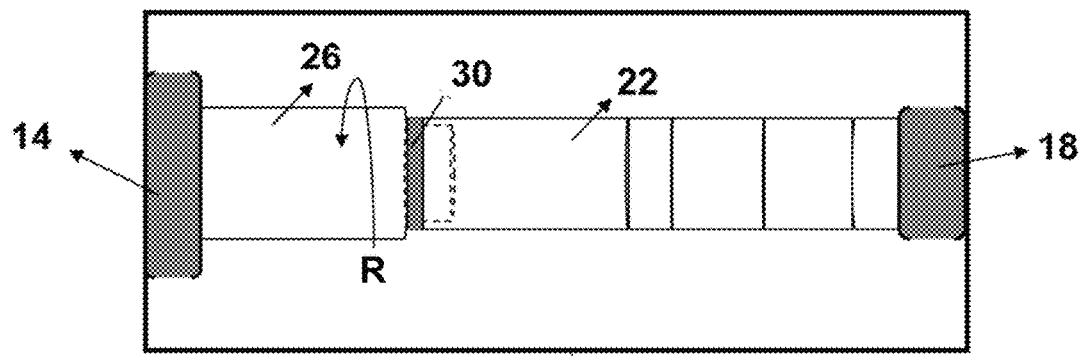
Figure 4:
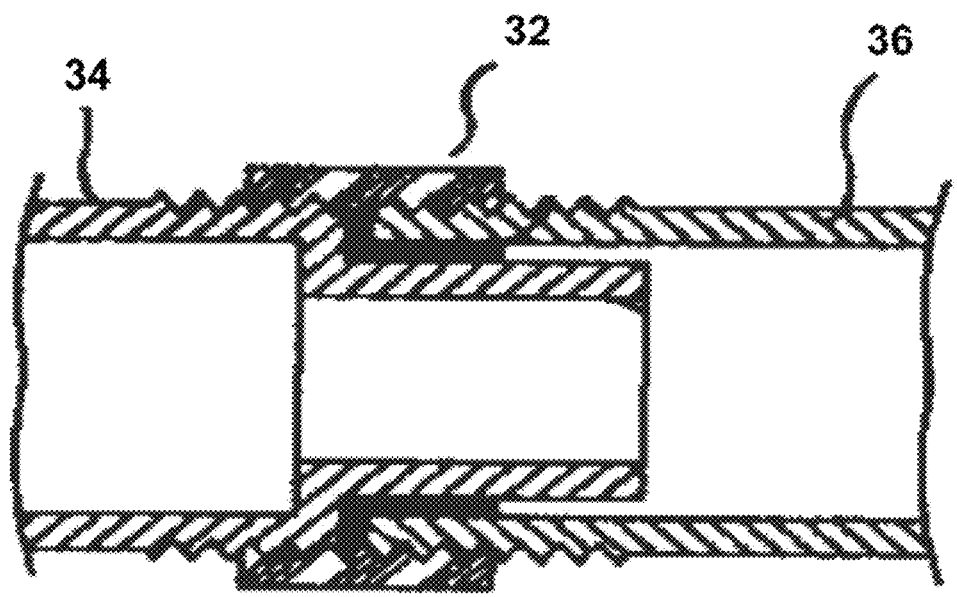
FIG. 4 is an illustration of a pipe fitting disclosed by Korean patent KR100143619 issued to Daewoo Motors, in accordance with the prior art.
Figure 5:
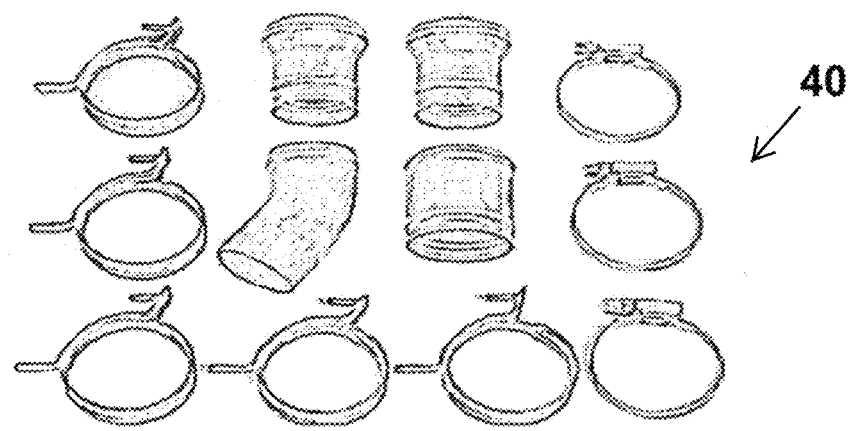
FIG. 5 is an illustration of components of a coolant pipe repair kit available from GoWesty, in accordance with the prior art.
Figure 6:
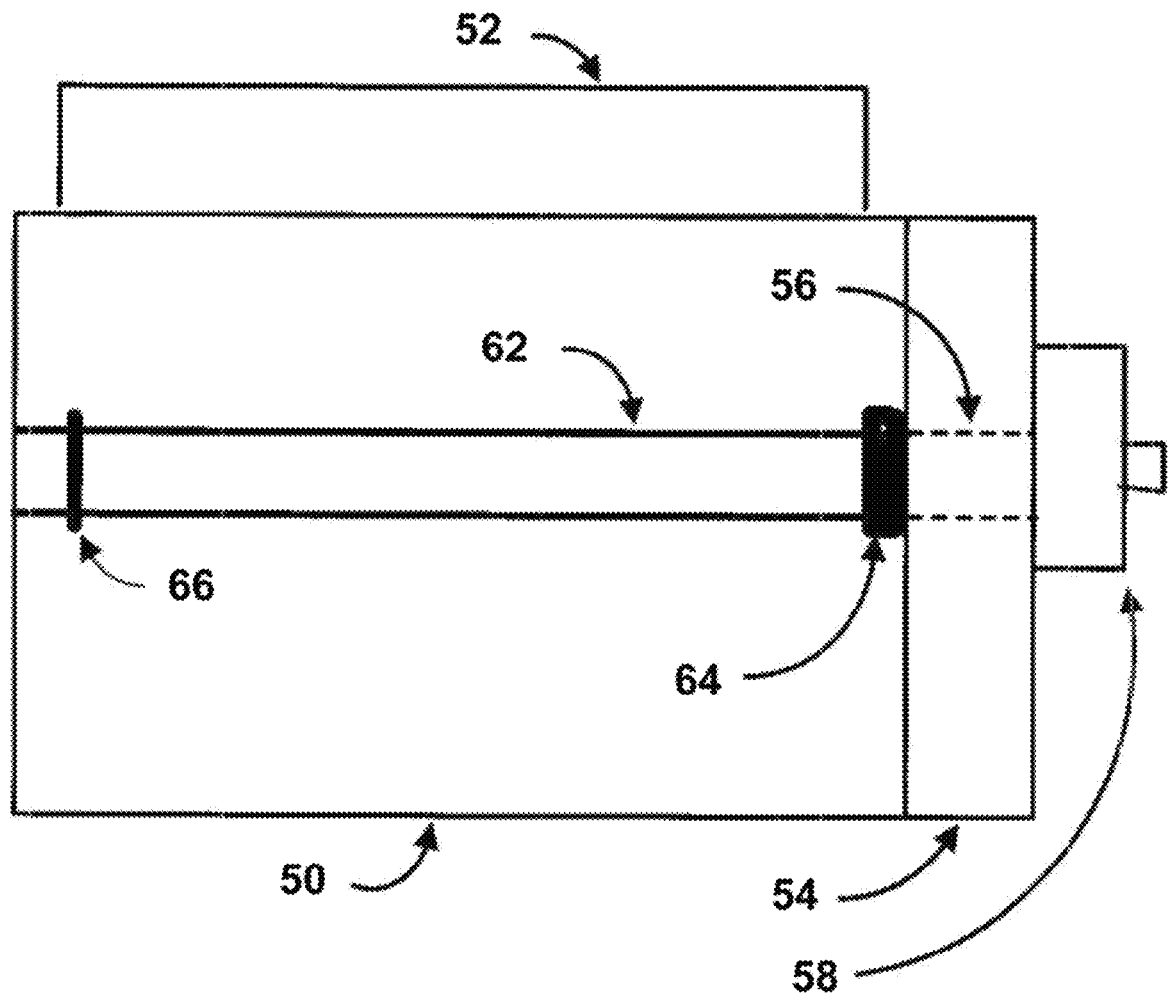
FIG. 6 is a side pictorial view illustrating a location of a coolant transfer pipe 62, within a conventional engine block, in accordance with the prior art.

FIG. 6 shows the side pictorial view illustrating a location of a coolant transfer pipe 62 within a typical engine block 50. This drawing illustrates a typical configuration for a BMW "N62" engine, but other engine configurations will still be within the teachings of this apparatus and method disclosure herein. During normal engine operation, the water pump 58 pumps coolant through the engine block 50, first from the water pump 58, through a timing cover coolant passage 56 in the timing cover 54, then past the front seal 64, and into the coolant transfer pipe 62. In some cases, there can also be some leaking from a rear O-ring Seal 66.

When a front seal 64 fails, coolant will escape between the front seal 64 and the coolant transfer pipe 62, causing the engine to become overheated and risk potential costly damage to the engine, and the potential for passengers of the vehicle to become stranded on the side of the road. In order to replace the coolant transfer pipe 62 and front seal 64, a mechanic would need to remove the intake manifold 52 and/or the timing cover 54, in order to remove the defective parts.

Figure 7:
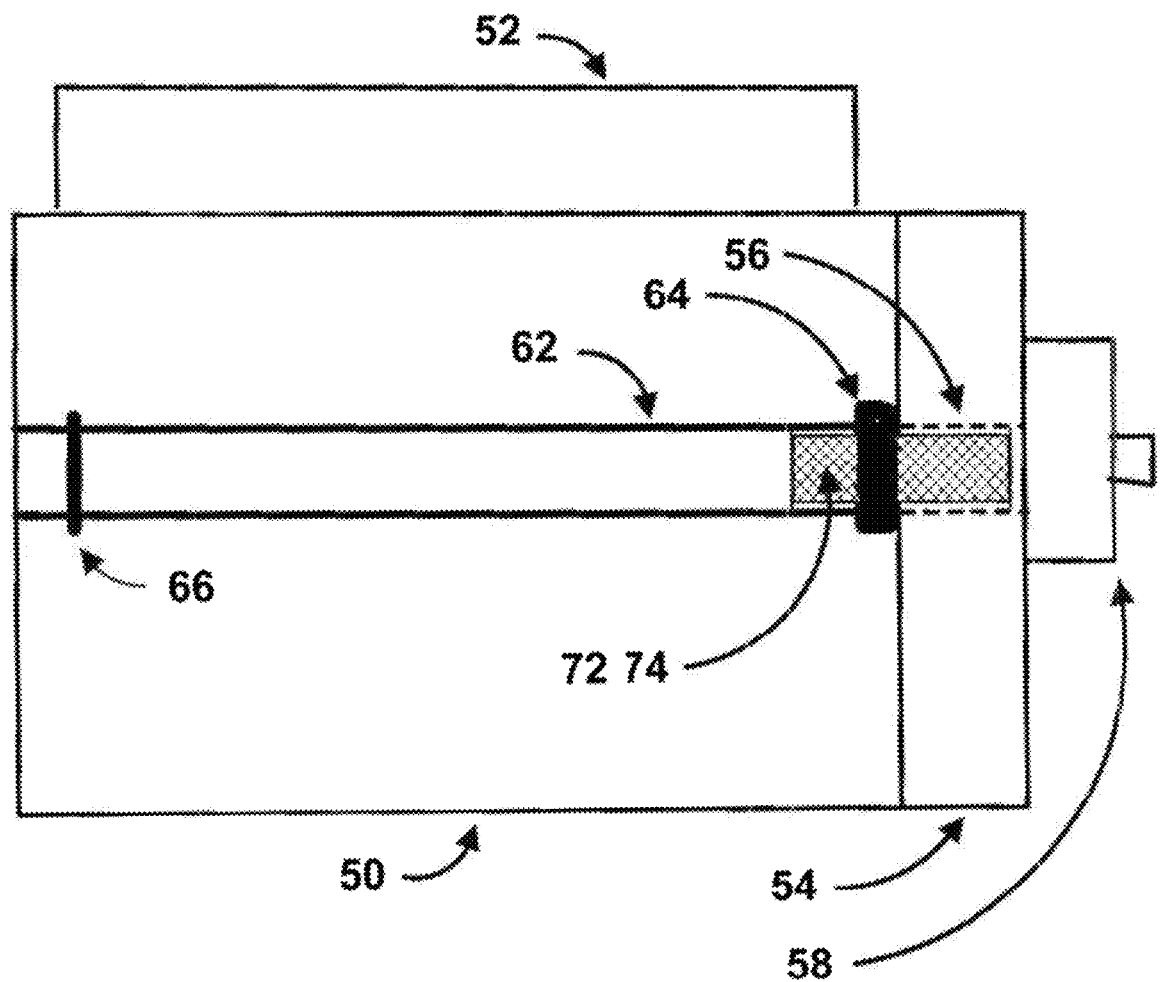
FIG. 7 is a side pictorial view of the conventional engine block of FIG. 6 illustrating application of an apparatus and method for repairing a leaking front seal and coolant transfer pipe, in accordance with the present disclosure.

FIG. 7 shows a unique apparatus and method for repairing the leaking front seal 64 and coolant transfer pipe 62, without the need to remove the intake manifold 52 or the timing cover 54, thereby saving many hours of expensive labor and costly parts and materials. After removing the water pump 58, a repair tube insert 72 may be coated with sealant 74 and inserted through the timing cover coolant passage 56 directly into the coolant transfer pipe 62.

The repair tube insert 72 when coated with sealant 74 creates a bond and seal between the timing cover coolant passage 56, the coolant transfer pipe 62 and the front seal 64, in order to stop coolant from leaking into the engine block 50. The original front seal 64 and the coolant transfer pipe 62 do not need to be removed from the engine block 50, and remain in place.

Figure 8:
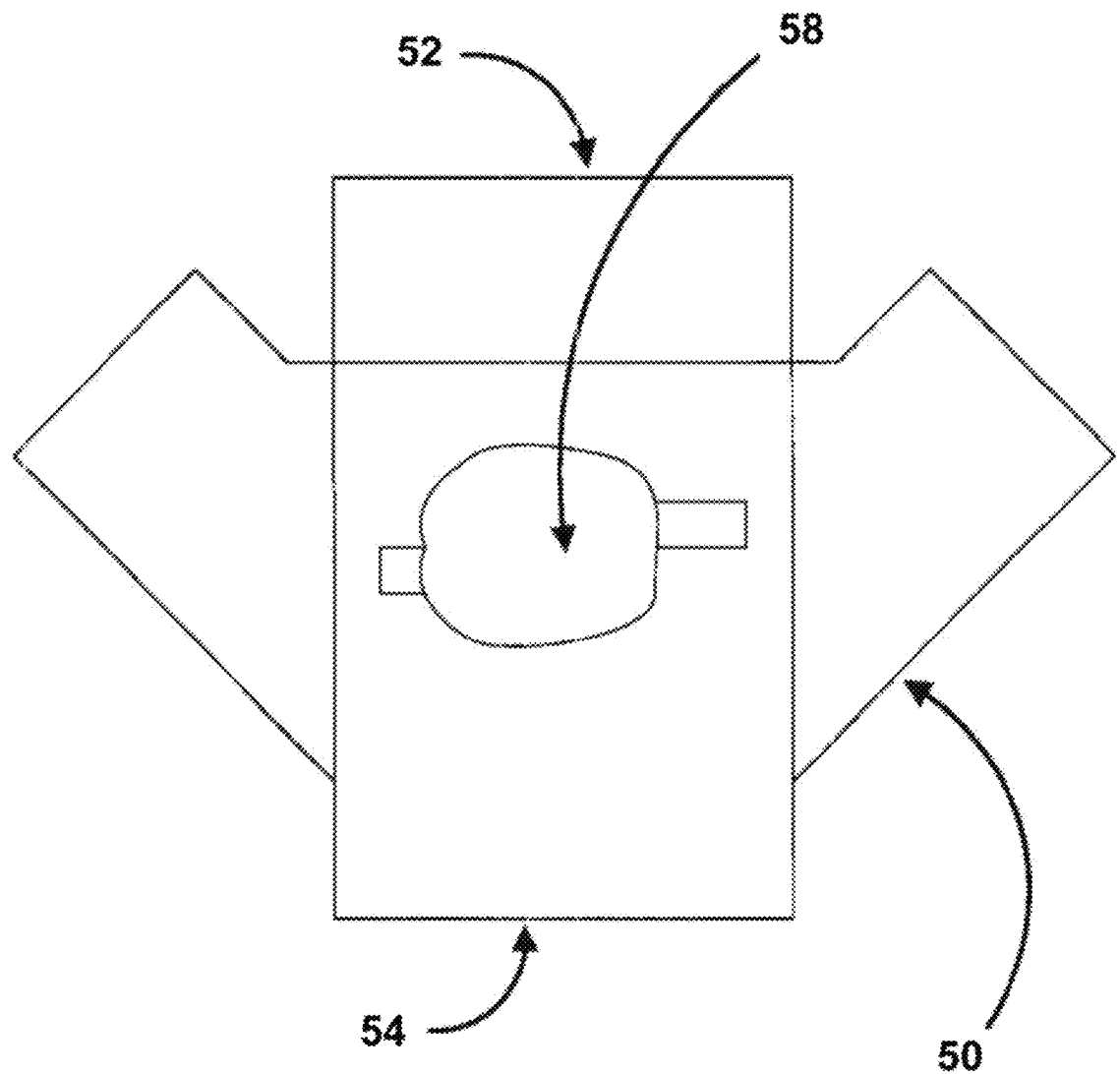
FIG. 8 is a front view of the conventional engine block of FIG. 7 with a water pump installed, in accordance with the present disclosure.
Figure 9:
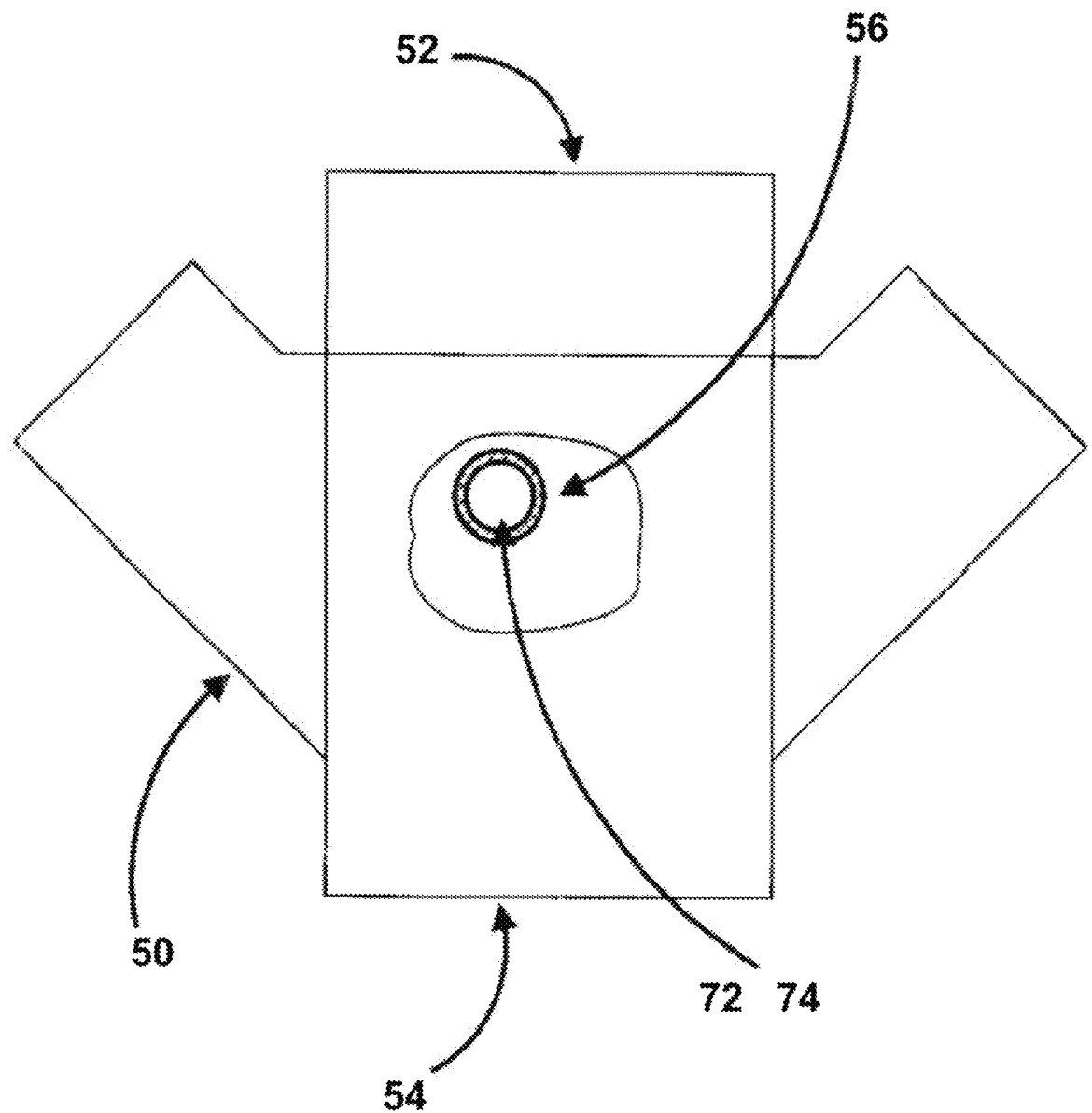
FIG. 9 is a front view of the conventional engine block of FIG. 7 with the water pump removed.
Figure 10A:
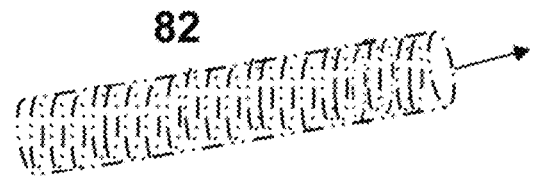
FIGS. 10A-10C illustrate repair kit components, including a sanding rod, a cleaning rod and an sponge applicator brush, in accordance with the present disclosure.
Figure 10B:
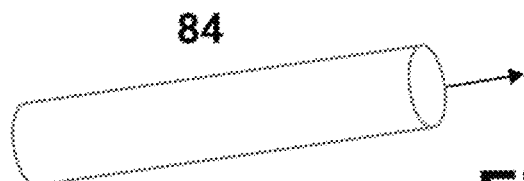
Figure 10C:
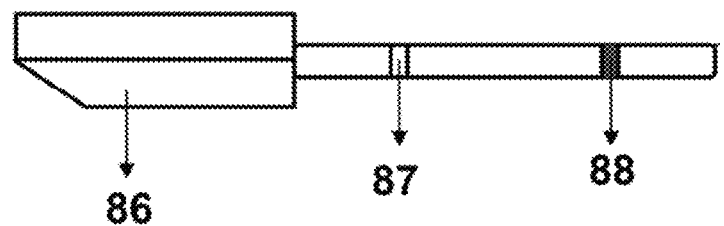

FIG. 8 shown a front view of a typical vehicle engine with a water pump 58, an intake manifold 52, a timing cover 54 and engine block 50. FIG. 9 shows the vehicle engine of FIG. 8 with the water pump 58 removed to provide access to the timing cover coolant passage 56. This access makes it possible to clean the inside walls of the timing cover coolant passage 56 and, as shown in FIG. 7, the front seal 64 and the coolant transfer pipe 62.

Once the inside walls of the surfaces are clean of any residual coolant or possible protrusions caused by the defective front seal 64 deformations, then the inside walls of these three surfaces can be coated with sealant 74. The outside walls of the repair tube insert 72 may also be coated with the sealant 74. Finally, the repair tube Insert 72 is inserted through the time cover coolant passage 56, front seal 64 and coolant transfer pipe 62. This procedure creates a substantially coolant tight seal when the sealant 74 is fully cured.

It can be appreciated that the automotive engine cooling system repair apparatus and method disclosed herein addresses the afore-described problem of leakage of coolant at the front seal in a coolant transfer pipe, and others by essentially providing an open ended, hollow repair tube insert 72 that is coated with sealant 74. The repair tube insert 72 coated with the sealant 74 is inserted into the luminal passage that is formed by the timing chain cover coolant passage 56; the defective front seal 64; and the coolant transfer pipe 62, in the engine block 50 of an automobile, and is placed approximately half way between the timing cover coolant passage 56 and the coolant transfer pipe 62, and is centered within the defective front seal 64.

Once the sealant 74 dries and cures, the sealant 74 forms a watertight seal between the repair tube insert 72, the coolant transfer pipe 62, the front seal 64, and the timing cover coolant passage 56. This entire procedure requires just the removal of the water pump 58 to gain access to the timing chain cover, failed coolant transfer pipe 62 and the defective front seal 64.

In accordance with an exemplary embodiment, the disclosed hollow, open ended, sealant-coated repair tube 72 insert that snugly sits at the desired portion of the luminal passage 56 formed by the timing chain cover coolant passage 56; the defective front seal 64; and the coolant transfer pipe 62, in the engine block 50 of an automobile, effectively seals off leakage at the defective front seal 64 without blocking the regular passage and flow of coolant through the luminal passage.

The disclosed method can save the user many hours of labor and expense. The repair can also be done by some skilled do-it-yourself vehicle owner, because the repair job does not require removing major parts of the engine. In addition, the shortened repair time will help the owner of the affected vehicle to get his vehicle back from the repair shop much faster, so the owner will not need to borrow or rent a vehicle for an extended period.

Figure 13:
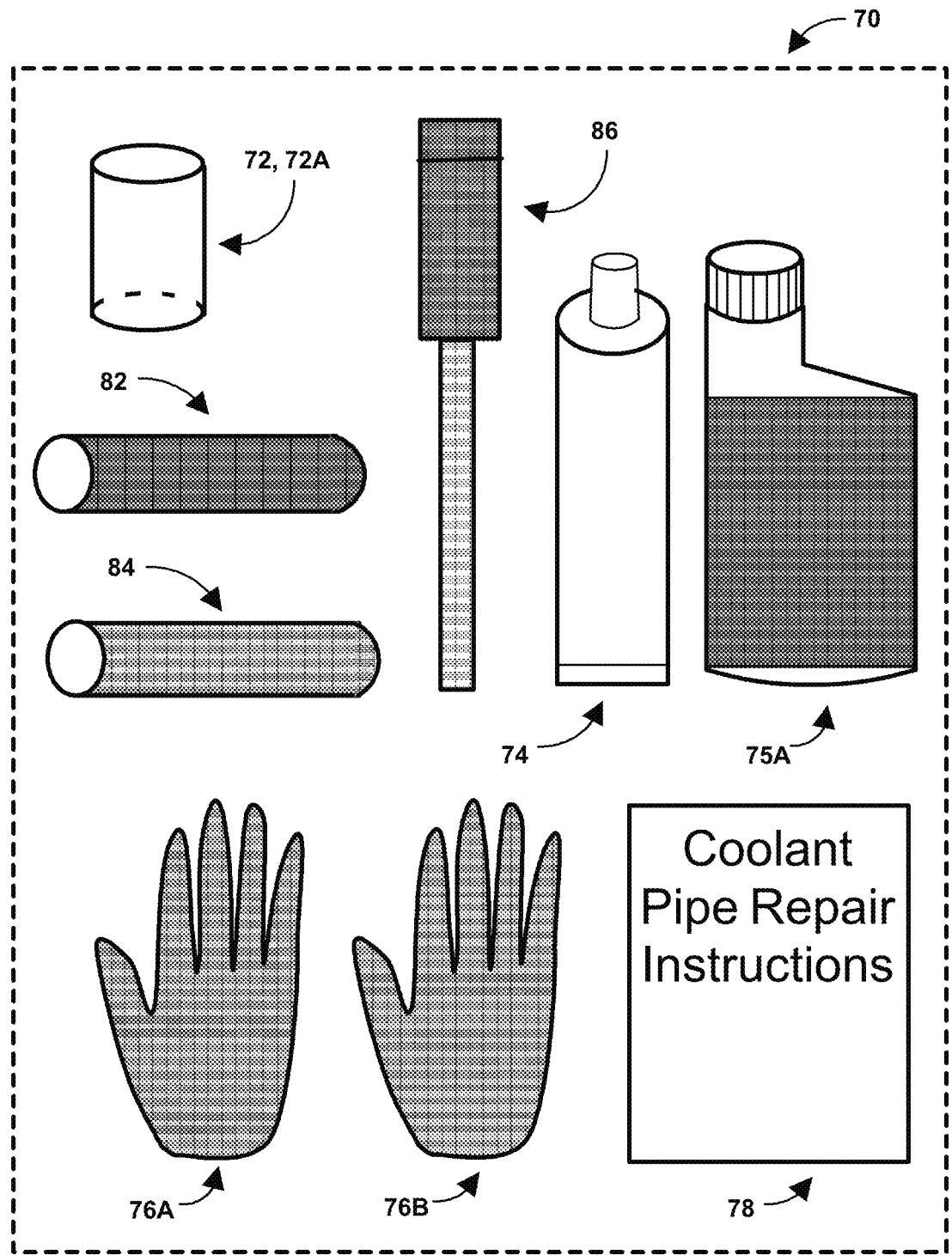
FIG. 13 illustrates a repair kit in accordance with yet another embodiment of the present disclosure.

The repair kit or apparatus disclosed herein is illustrated in FIG. 13 and comprises at least one open ended, hollow repair tube insert or stent 72 (or 72A as described in further detail below), at least one cleaning rod 84, at least one sanding rod 82, one or more sponge applicator brushes 86, at least one pair of rubber work gloves 76A, pairs of disposable rubber gloves 76B, at least one tube or pack of coolant pipe repair sealant 74A, at least one bottle or jar of cooling system sealer/coolant pipe O-ring conditioner conditioner 75, and detailed written instructions 78 with illustrations. The cooling system sealer/coolant pipe O-ring conditioner 75 are optional, as it is not necessarily required to achieve the objectives of the repair disclosed herein. The cooling system sealer and conditioner 75 is not required to stop the "weep hole" leak from the front seal on the coolant transfer pipe. The front seal leak is repaired by the stent 72. However, cooling system sealer/coolant pipe O-ring conditioner 75, is designed to condition the seals of the coolant transfer pipe, valley pan and gasket, as well as the gaskets of the rear coolant passage cover.

The repair tube insert 72 outside diameter (OD) will be slightly smaller than the inside diameter (ID) of the coolant transfer pipe 62 and timing cover coolant passage 56, so that when the repair tube insert is "dry fitted" (i.e., without sealant 74 in place), it is a snug fit as the repair tube insert 72 is inserted through the timing cover coolant passage 56.

The repair tube insert 72 may be constructed of a variety of alloys or rigid materials or semi-rigid materials, or non-rigid materials, including, but not limited to, metal, plastic, poly vinyl chloride (PVC), ceramic, fiberglass, rubber, silicone, adhesive tape, composites and other forms of rigged, semi-rigged and non-rigged materials.

Figure 11A:

The sealant 74 may be a silicon-containing product or silicone based material, epoxy based material, petroleum based product, or any other material or gasket that will provide a watertight seal between the repair tube insert 72, the coolant transfer pipe 62, the front seal 64, and the timing cover coolant passage 56. The repair tube insert 72 or "stent 72" is an open ended, hollow cylindrical tube with circular ends. FIG. 11A illustrates the structure of the stent 72. In an exemplary embodiment, the stent 72 is approximately five inches in length and has an outer diameter of about 1¼ inches.

The repair procedure, which is common for all of the stents disclosed herein, with logical variations including additional or fewer steps that are apparent to a person skilled in the art, involves the following steps:

1. Draining the coolant from the vehicle.
2. Removing the water pump 58 from the engine block 50.
3. Elevating the front of the vehicle, so that any remaining coolant in the coolant transfer pipe 62 drains to the back of the engine block 50, and the remaining coolant does not interfere with the application of the sealant 74.
4. Inspecting for detecting the defective front seal 64 within the timing cover coolant passage 62 by using fingers to feel for the same. In some cases, where the defective front seal 64 might be protruding into the timing cover coolant passage 62, an inspection mirror or camera may also be used to inspect the inside of the timing cover coolant passage 62 and front seal 64. Cutting away any protruding parts of the defective front seal 64, if required with a knife, so that the defective front seal 64 does not block or interfere with the insertion of the repair tube insert 72 during a "dry fit" test.
5. Drying, cleaning and sanding the inside of the timing cover coolant passage 56 and the coolant transfer pipe 62, once the repair tube insert 72 fits snuggly into the timing cover coolant passage 62, in order to create a dry and clean surface. Applying the sealant 74, using a brush or fingers, onto the first few inches (approximately five inches) of the inner sidewalls of the timing cover coolant passage 56, coolant transfer pipe 62 and defective front seal 64.
6. Coating the outside walls of the repair tube insert 72 with the sealant 74. In the case of a N62 engine repair example, the repair tube insert 72 is approximately 5 inches in length, and approximately 1¼ inches in outer diameter. Inserting the coated repair tube insert 72 into the timing cover coolant passage 56 and coolant transfer pipe 62, so that the repair tube insert 72 is approximately half way between the timing cover coolant passage 56 and the coolant transfer pipe 62, and is centered within the defective front seal 64. FIG. 7 provides an illustration for the proper placement of the repair insert tube 72 and removing any excess sealant 74.
7. Finally, allowing the sealant 74 to fully cure. Once the sealant is fully cured, the water pump 58 can be re-installed, and the vehicle can be re-assembled.

The sealant is resistant to, insoluble in or immiscible with water, antifreeze and any mixture thereof. Therefore, once the sealant, which is present in the narrow space between the stent 72 and the inner walls of the coolant transfer pipe 62, timing cover coolant passage 56 and the front seal or its remnant, is fully cured, it provides a watertight seal between the repair tube insert 72, the coolant transfer pipe 62, the front seal 64, and the timing cover coolant passage 56.

It is to be understood, however, that the method and apparatus disclosed herein may be embodied in various forms. Therefore, specific details disclosed herein are not to be interpreted as limiting, but rather as a basis for the claims and as a representative basis for teaching one skilled in the art to employ the techniques disclosed herein in virtually any appropriately detailed system, structure or manner. Even the apparatus and the corresponding method of any of the disclosed elements may be applied by any person skilled in the art to any other system or setting, like the cooling system of a different vehicle, as applicable.

The stent and method of the instant disclosure are designed to stop the leakage of coolant at the front seal 64 in the coolant transfer pipe in 4.4 litre and 4.8 litre V-8 N62 engined BMW cars. This includes the BMW 545i, 550i, 645Ci, 650i, 745i, 750i, the X5 SUV and more. The BMW Coolant Pipe Repair System comprises the following:

1. One repair tube insert or stent 72 (repairs front coolant pipe seal leak);
2. One tube of coolant pipe repair sealant 74;
3. One bottle of cooling system sealer and conditioner;
4. One round sanding rod 82;
5. One round cleaning rod 84;
6. Six sponge applicator brushes 86;
7. One pair of rubber work gloves;
8. Four pairs of disposable rubber gloves; and
9. Detailed written instructions with systematic procedure illustrated with color photographs.

The steps required to perform the repair procedure disclosed by the present embodiment include:

1. Removing expansion tank cap from the coolant expansion tank when the engine is cool to avoid burns;
2. Removing front splashguard (if equipped) to access the radiator drain valve;
3. Opening the radiator drain valve, located at the bottom of the radiator on the right hand side and collecting the coolant in a container when the radiator drain valve is opened;
4. Draining, collecting and recycling coolant from the radiator;
5. Raising the front of the vehicle approximately four inches to ensure that any remaining coolant in the engine drains to the backside of the engine block, and does not interfere with the repair process;
6. Removing the fan cover;
7. Removing the engine cover;
8. Removing fresh air intake duct between air filter box and intake manifold;
9. Removing the fan clutch;
10. Removing the drive belt;
11. Removing the sensor plug connections and water pump pulley. Removing vacuum hoses, coolant hoses, and sensor attachments as needed to access the water pump. Unlocking and detaching all coolant hoses on water pump. Releasing screws and removing belt pulley;
12. Removing air conditioner compressor belt by releasing tension on the lower fan belt tensioner using a Torx wrench;
13. Removing lower crank case pulley in order to gain access to all the water pump bolts ensuring that only the eight Torx bolts attaching the crank case pulley are removed and the large bolt in the center of the lower crank case pulley stays in place, and is not loosened or removed;
14. Releasing water pump bolts and removing water pump;
15. Inspecting the coolant transfer pipe using the index finger for obstructions caused by the faulty front seal;
16. Cutting out, with a knife, any obstructions caused by the old coolant transfer pipe seal. Cutting away any small pieces of the old seal that may be sticking-out into the pipe and then removing any loose debris remaining in the coolant transfer pipe after the cutting taking care not to remove the entire old seal;
17. Sanding down a metal bump called a "casting mark" to ensure that the new stent 72 fits into place without any obstruction;
18. Sanding the insides of the coolant transfer pipe using the sanding rod such that the surfaces are "roughed-up" and cleaned of any coolant residue to ensure proper bonding of the stent 72 and sealant to the coolant transfer pipe and the timing chain cover. It is recommended to elevate the front of the vehicle slightly, so that any residual coolant in the coolant transfer pipe drains to the back of the engine block, and does not interfere with the sealing process. If a large casting mark bump is present, then a small electric grinder, such as a drill or a dermal tool, may be used to speed-up the sanding process.
19. Cleaning the inside surfaces of the timing chain cover and coolant transfer pipe in preparation for applying the sealant. A shop vacuum may be used to remove any loose material and antifreeze that may be in the coolant transfer pipe. The cleaning rod may be sprayed with brake parts cleaner to ensure that the inside of the timing chain cover and the coolant transfer pipe are as clean and dry as possible before applying the coolant pipe sealant.
20. "Dry-fitting" the stent 72 into the timing chain cover and coolant transfer pipe such that the stent 72 is able to slide in and out freely. Forcing-in the stent 72 is not recommended.
21. In case there is resistance, then additional cutting of the front seal, or sanding of the "casting mark, until the stent 72 fits in place and slides in-and-out, without becoming bound-up. Ensuring that the stent 72 is placed 1¼ inches inside of the flat water pump mounting surface;
22. Donning the rubber gloves, and getting the stent 72 and tube of coolant pipe repair sealant ready;
23. Removing the stent 72 from the Timing Chain Cover after the "Test-Fix";
24. Squeezing the sealant onto the index finger;
25. Once the stent 72 has been removed, forcing the sealant into any gaps and crevices around the internal rubber front seal of the coolant transfer pipe. Applying sealant to the inner walls of the timing chain cover and coolant transfer pipe, so that the sealant sticks to the inner walls;
26. Applying the coolant pipe repair sealant to a sponge applicator brush 86. Coating the inside passage of the timing chain cover and coolant transfer pipe with the coolant pipe repair sealant, ensuring that the sponge brush is not inserted past the "RED" mark 87 on the handle;
27. Coating the stent 72 with the sealant. Inserting the stent 72 into the timing chain cover and coolant transfer pipe. Rotating and turning the stent 72 slowly in a clockwise direction as the stent 72 is inserted. Stopping at the 1¼ inch mark.
28. Using a smart phone to photograph the insides of the coolant transfer pipe and to look very closely for possible obstructions of the pipe caused by excess sealant.
29. Ensuring that any blockage is removed from the coolant transfer pipe because it could cause overheating of the engine and result in engine damage;
30. Brushing, using a clean sponge, to remove any excess sealant immediately after installing the stent 72 in order to make sure that any blockage has been removed. Inserting the sponge brush all the way up to the "BLACK" mark 88 on the handle of the brush 86 during the cleaning process;

31. Taking additional photos of the stent 72 and the insides of the coolant transfer pipe and continuing to clean the pipe until it is totally free of any possible blockage.

32. Once the stent 72 is free of any possible blockage, allowing the stent 72 and sealant to dry for 24-hours before re-assembly and adding antifreeze.

33. Adding the cooling system sealer cum Coolant pipe O-ring Conditioner directly into the upper radiator hose before attaching the hose to the upper radiator outlet, during the re-assembly process;

34. Driving the vehicle for about 200 miles after re-assembly, for the cooling system sealer cum conditioner to fully condition and seal the engine block and cooling system. The cooling system sealer cum conditioner stays in the cooling system, and does not need to be removed after 200 miles.

The repair tube inserts of the alternative embodiments disclosed herein can have different shapes and geometry from that of the above-described, depending on the geometry of the timing chain cover passage and the coolant transfer pipe against which the stent 72 is required to provide a leak-free seal and fit. Stent 72 is essentially an open ended, hollow, tube-like structure the shape and geometry of which may vary based on the geometry of the luminal passage that is formed by the timing chain cover coolant passage, the front seal and the coolant transfer pipe.

Stent 72 corresponds in shape to the geometry of the luminal passage that is formed by the timing chain cover coolant passage; the front seal; and the coolant transfer pipe, in the engine block of the automobile. Its outer dimensions are a little smaller than the inner dimensions of the aforementioned luminal passage, which allows the stent 72 to be comfortably placed at the desired portion of the luminal passage and ensures a sufficiently tight fit of the stent 72 in the luminal passage. Stent 72 can have any shape, dimensions that enables it to be comfortably inserted and placed at the desired portion of the luminal passage, and ensures a sufficiently tight fit of the stent 72 in the luminal passage.

Figure 11B:
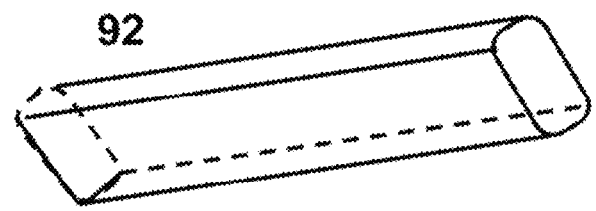
Figure 11C:
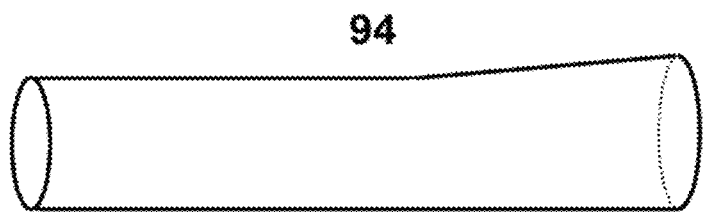

FIG. 11B illustrates the structure of an alternative configuration of a stent 92, which is a hollow cuboidal open ended tube having rectangular ends with beveled edges. FIG. 11C illustrates the structure of a stent 94 configured as a hollow semi-tapered, open ended, cylindrical tube that evens out to a right circular cylinder at a certain point along its length.

Figure 11D:
Figure 11E:
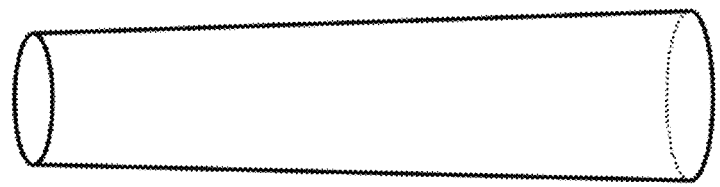

FIG. 11D illustrates the structure of a stent 96 configured with circular ends, the stent 96 being a hollow tapering open ended cylindrical tube that evens out to a right circular cylinder at a certain point along its length. FIG. 11E illustrates the structure of another type of stent 98, configured as a hollow tapering open ended cylindrical tube. This stent 98 can be used in a BMW N73 V-12 engine that requires a taper at one end of the stent 98 in order to create a better seal and fit against the timing chain cover.

FIG. 11F illustrates the structure of a stent 102, which is a hollow semi-tapered open ended cylindrical tube. FIG. 11G illustrates the structure of a stent 104, which is a hollow open ended oval tube having oval ends.

FIG. 11H illustrates the structure of a stent 106, which is open ended; and half of which is a hollow right circular cylindrical tube 108 and the other half is a rectangular, hollow tube 110. The circular cylindrical tube 108 may be inserted into a round coolant transfer pipe, and the rectangular, hollow tube 110 interfaces with a timing chain cover. This type of stent 106 can be used in a few models of Range Rover.

FIG. 11J illustrates the structure of a stent 112, which is a hollow semi-cylindrical or semi-oval tube having semi-circular or semi-oval ends, as the case may be; has a flat flared bottom side and a tapering top side. There could be several other variations in the shape and geometry of the repair tube insert and all such embodiments would still be deemed to be within the scope and teachings of the instant disclosure.

Figure 12A:
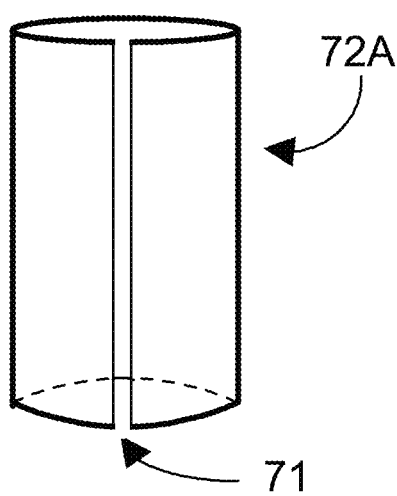
FIGS. 12A-12C are a front perspective view, a back perspective view and an end view, respectively, of a repair tube insert in accordance with another embodiment of the present disclosure.
Figure 12B:
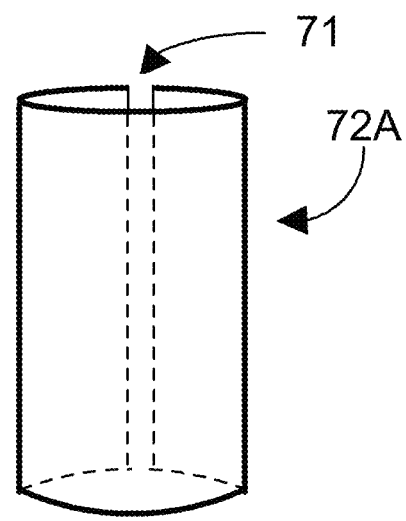
Figure 12C:
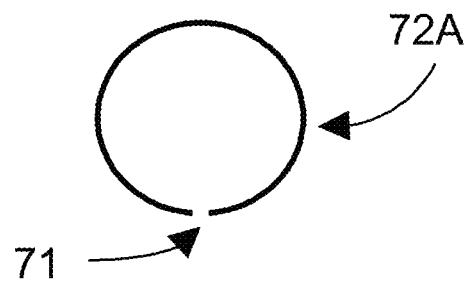

FIGS. 12A-12C illustrate the structure of yet another alternative stent 72A, which is in the form of a hollow semi-cylinder having a gap 71 extending along the length of stent 72A, i.e., the circumference of stent 72A does not form a completely closed circle, at least until stent 72A is inserted into the coolant transfer pipe. Stent 72A may be referred to as a split stent or a split version of the above-described cylindrical stents. Stent 72A is generally sized the same as the above-described stents, e.g., a completed circumference of stent 72A may have an outside diameter of 1.25 inches to fit a BMW N62 engine and gap 71 may be approximately ⅛ inch across. The length of stent 72A is generally 2.5 inches, but may alternatively be sized in a range between 1 to greater than 6 inches. Stent 72A may require some circumferential compression in order to accomplish the insertion and will ease installation of stent 72A through the coolant transfer pipe. The subsequent expansion after stent 72A is inserted and allowed to expand may help secure stent 72A in place. Gap 71 is provided to ease removal of stent 72A in the event further repair or replacement of the water pump is necessary, as stent 72A can be bent for removal. Stent 72A is formed from a rigid or semi-rigid material such as metal, plastic, rubber, or other waterproof material able to maintain the physical shape of the stent 72A. The installation procedure is the same as for the other above-described stents and stents having other shapes, such as those described above may also include a gap such as gap 71 to ease installation and/or removal of a stent.

Figure 14A:
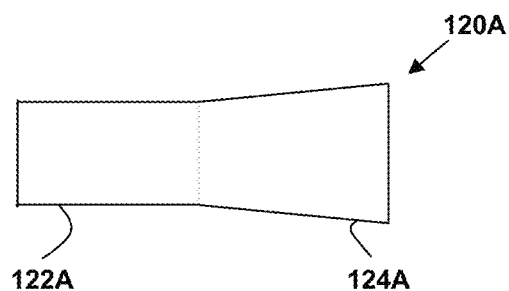
FIGS. 14A-14B are side views illustrating flared stents in accordance with embodiments of the present disclosure.

Referring now to FIG. 14A a flared repair stent 120A is shown, which may be installed according to the above described methods. Flared repair stent 120A has a cylindrical portion 122A having a circular profile of even radius, and a flared portion 124A having a conical profile with an increasing radius in the direction of the end of flared repair stent 120A to the right end of the Figure. Flared repair stent 120A is generally made from a flexible material such as rubber, silicone or a high-temperature thermoplastic. Installation of flared repair stent 120A is accomplished as described above, including applying sealant, but flared portion 124A is compressed by hand before extending flared repair stent 120A though a coolant passage having a diameter smaller than the diameter range of flared portion 124A. After flared repair stent 120A is slid into place, flared portion 124A expands to contact the walls of the remote end of the coolant passage, providing an enhanced seal.

Figure 14B:
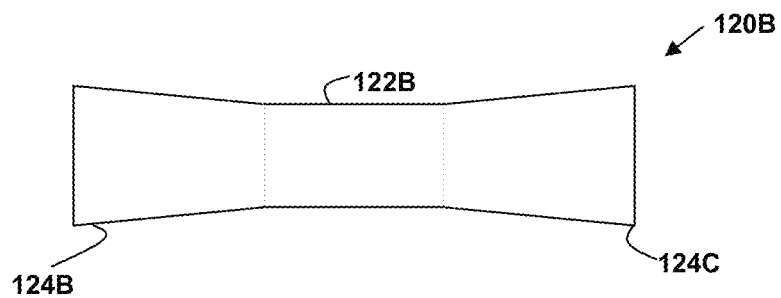
Figure 15A:
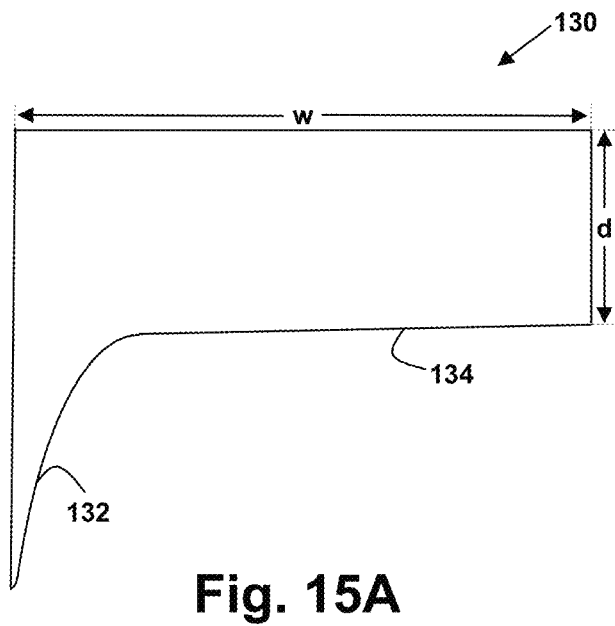
FIGS. 15A-15C are a side view, a first end view and a second end view, respectively, of another flared stent 130 in accordance with an embodiment of the present disclosure.
Figure 15B:
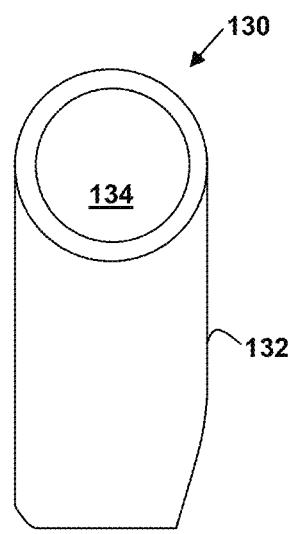
Figure 15C:
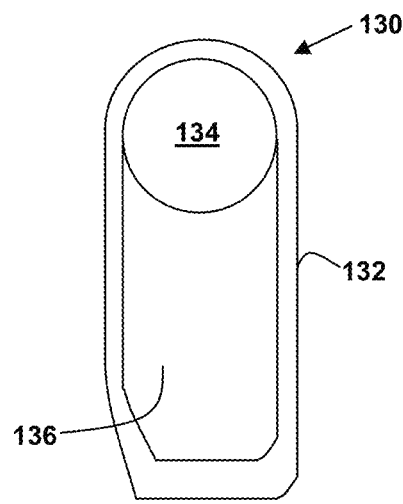

Referring now to FIG. 14B, another flared repair stent 120B is shown in accordance with an alternative embodiment of the disclosure. Flared repair stent 120B has a central cylindrical portion 122B and two flared portions 124B and 124C, one at each end. While the profiles of flared portions 124B and 124C are matched in the Figure, this is not a limitation of the disclosure, and flared portions 124B and 124C may have different conical profiles and length. In an alternative version of flared repair stent 120B, central cylindrical portion 122B is reduced in length or eliminated entirely, providing a flared repair stent 120B with two flared portions 124B and 124C that expand outward from a single plane. Either of flared portions 124B and 124C may be compressed for insertion within the coolant passage Referring now to FIGS. 15A-15C, a side view, a first end view and a second end view of a flared repair stent 130 are shown, in accordance with another example of the disclosure. Flared repair stent 130 may be made of metal such as cast aluminum, or may be made from a flexible material such as rubber, silicone, or a high-temperature thermoplastic. Flared repair stent 130 has a flared portion 132 that curves inward to a cylindrical portion 134. i.e., the radius of flared repair stent 130 reduces according to the shape of a parabola in the illustrated embodiment, but other curvature may be employed as needed to match the curvature of an expansion 137 of coolant passage 142 (FIG. 17) in which flared repair stent 130 is designed for installation. Flared portion 132 has a first partial cylindrical profile 133 that extends a profile of cylindrical portion 134 along an upper portion of length w of the first flared portion and a lower portion 135 that is an expanding profile along which flared 132 portion expands in cross-sectional area toward a second end of the flared portion 132, according to a parabolic shape in the figure as described above. At the exit end of flared repair stent 130, the expanding profile of flared portion 132 expands to a substantially rectangular cross-section to the point where the partial cylindrical profile of the upper portion terminates. Length w of flared repair stent 130 is also adjusted to accommodate various designs, but is generally between 50 mm and 100 mm in length, For example, in a design adapted for repairing the coolant passage of a BMW N63, an N73 engine or an N74 engine, length w is 60 mm, while the diameter d of cylindrical portion 134 is 32 mm. For a BMW N62 engine, length w is 75 mm and diameter d is 32 mm. FIG. 15C shows the interior of flared portion 132 of flared repair stent 130, including an inner chamber 136 that is sloped to direct coolant in the same manner as the wall of the water pump cover (not shown) directs the coolant originally, i.e., the curvature of inner chamber 136 substantially matches the curvature of the exterior surface of flared portion 132 as seen in FIG. 15A, at least along the portion of inner chamber 136 nearing cylindrical portion 134.

Figure 16A:
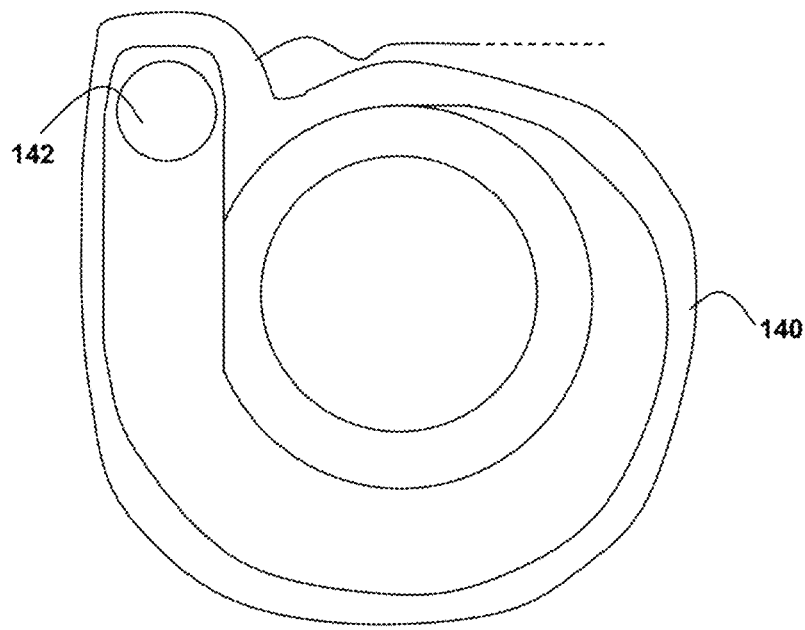
FIGS. 16A-16B are interior views of a water pump housing illustrating installation of flared stent 130 according to FIGS. 15A-15C.
Figure 16B:
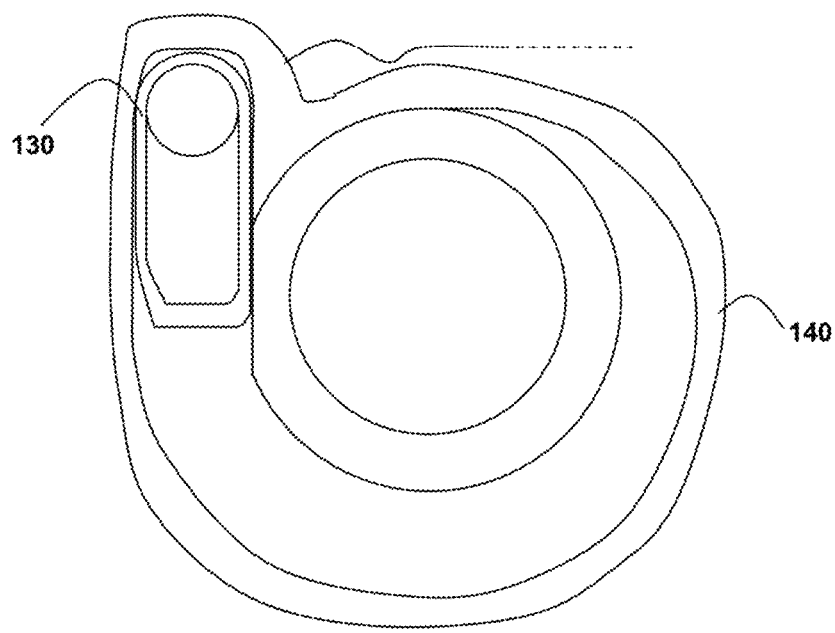
Figure 17:
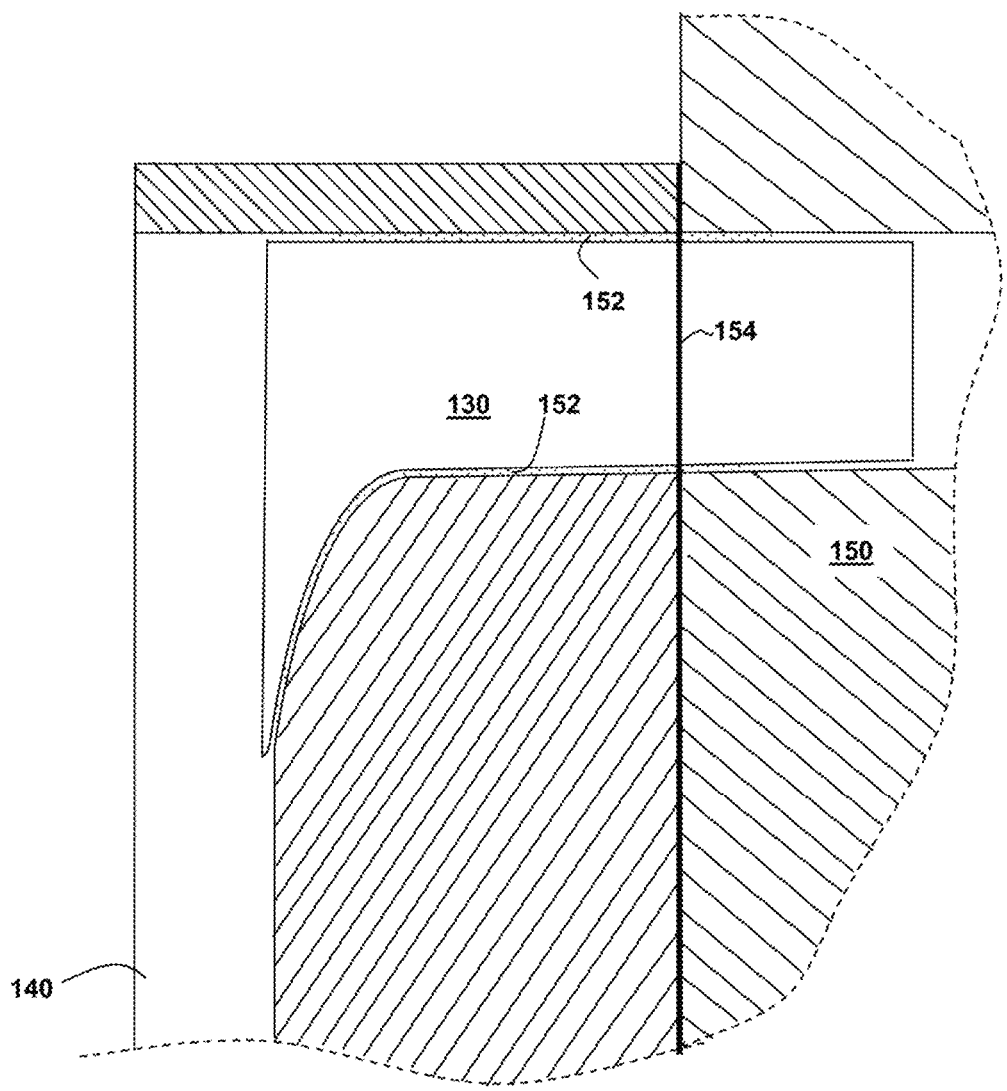
FIG. 17 is a side cross-section view of an installation of flared stent 130 within water pump housing 140.

Referring now to FIGS. 16A and 16B, which show an interior view of timing chain cover 140, an installation of flared repair stent 130 into timing chain cover 140 is illustrated. In the particular engines listed above, the cooling system does not use a coolant transfer pipe to convey coolant, i.e., a coolant passage 142 in timing chain cover 140 extends directly to the engine block. FIG. 16A shows a pertinent portion of timing chain cover 140 without flared repair stent 130 installed, including an outer flange 141 that defines a wall of a coolant channel 142A, and FIG. 16B shows timing chain cover 140 with flared repair stent 130 in place. Referring to FIG. 17, a cross-section of an installation of timing chain cover 140 to an engine block 150 is shown, with cylindrical portion 134 of flared repair stent 130 extending from timing chain cover 140 through a gasket 154, which is generally the site of a coolant leak, into engine block 150. Flared repair stent 130 is secured within timing chain cover 140 and the coolant passage of engine block 150 by a sealant 152 is pre-applied to flared repair stent 130 as described above.

Figure 18A:
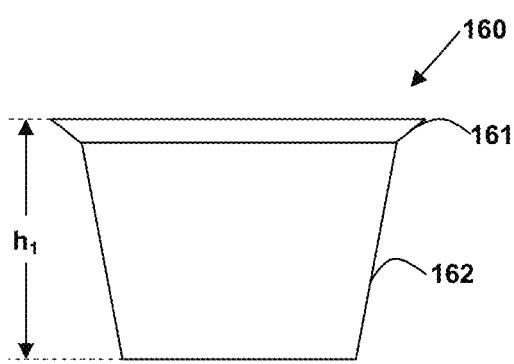
FIGS. 18A-18C are a top view, an end view and a side view, respectively, of another flared stent 160 in accordance with an embodiment of the present disclosure.
Figure 18B:
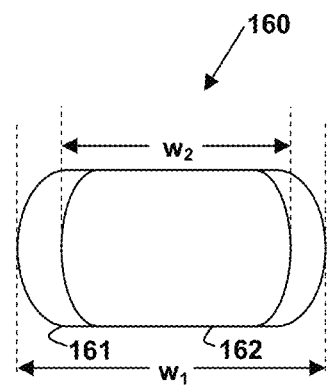
Figure 18C:
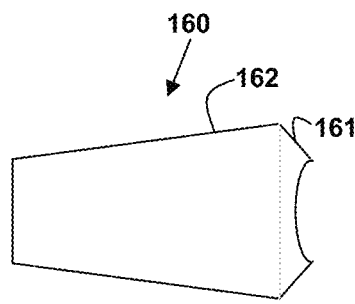

Referring now to FIGS. 18A-18C, another example flared repair stent 160 is illustrated in accordance with an embodiment of the disclosure, which is made of flexible material such as rubber, silicone or a high-temperature thermoplastic. Flared repair stent 160 has a dual trapezoidal profile in top view FIG. 18A, with the wider flared portion 161 inclined inward at the top and bottom of the large end of flared repair stent 160 as illustrated in side view FIG. 18C. A narrower flared portion 162 tapers to the other end of flared repair stent 160. Flared repair stent 160 has an oval-shaped cross-section as illustrated in FIG. 18B and is suitable for installation in BMW N-63 V-8 engines, in which the return coolant passes back through the timing chain via a return passage (i.e., through gasket 154 in FIG. 17), which may also develop leaks. Flared repair stent 160 is installed in the return passage of the N63 V-8 engine to repair the leak, according to the methods disclosed above. The length $h_1$ of flared repair stent 160 is 45 mm, the width $w_1$ of wider flared portion 161 is 65 mm, and the width $w_2$ of narrower flared portion 162 is 45 mm.

Referring now to FIGS. 19A-19C, another example flared repair stent 170 is illustrated in accordance with an embodiment of the disclosure. Flared repair stent 170 has a five-sided profile with a rectangular outline, except for a corner recess 174 along the profile of flared repair stent 170 as seen in FIG. 19B (and also in FIG. 19A), which is provided to both avoid a bolt stud that passes through the coolant passage and to prevent blockage of an air bleed hole that is present in the location of the recess. As seen in side view FIG. 19C, an inclined profile portion 173 of flared repair stent 170 is provided to accommodate a shape of the exit of coolant passage through the timing chain cover of the BMW N62 V-8 engine into the block and abuts a rectangular portion 172 as modified by corner recess 174. Flared repair stent 170 is made of a flexible material such as rubber, silicone or a high-temperature thermoplastic, in order to compress flared repair stent 170 to avoid the stud mentioned above, but is otherwise installed according to the methods disclosed above.

It is to be understood that the description herein is only exemplary, and is intended to provide an overview for the understanding of the nature and character of the disclosed repair systems and methods. The accompanying drawings are included to provide a further understanding of various features and embodiments of the method and devices of the invention which, together with their description serve to explain the principles and operation of the invention.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A repair kit for use in repairing an engine by stopping a coolant leak, the repair kit comprising:
    a repair stent having a cylindrical portion sized to fit within a coolant passage of the engine and a flared portion contiguous at a first end of the flared portion with a first end of the cylindrical portion and shaped to match an expansion of the coolant passage along an extent of the flared portion toward a second end of the flared portion, wherein the flared portion has a first partial cylindrical profile that extends a profile of the cylindrical portion axially along a portion of a length of the flared portion and a second expanding profile along which the flared portion expands in cross-sectional area toward the second end of the flared portion; and
    a package of coolant pipe repair sealant for affixing the repair stent within the coolant passage.

2. The repair kit of claim 1, wherein the repair stent is formed from a flexible material.

3. The repair kit of claim 1, wherein the repair stent is a rigid metal repair stent, wherein the flared portion is machined or cast to conform to a shape of the expansion of the coolant passage.

4. The repair kit of claim 1, wherein the second expanding profile of the flared portion includes parallel interior walls extending from an interior of the first partial cylindrical profile along a portion of a height of the second end of the flared portion.

5. The repair kit of claim 4, wherein a length of the repair stent including the cylindrical portion and the flared portion is 75 millimeters, wherein a diameter of the cylindrical portion is 32 millimeters, and wherein the height of the second end of the flared portion is 60 millimeters.

6. The repair kit of claim 4, wherein a length of the repair stent including the cylindrical portion and the flared portion is 60 millimeters, wherein a diameter of the cylindrical portion is 32 millimeters, and wherein the height of the second end of the flared portion is 60 millimeters.

7. The repair kit of claim 1, further comprising:
a sanding rod for removing a casting mark and cleaning the coolant passage;
a cleaning rod for cleaning the coolant passage; and
a sponge applicator brush for applying the coolant pipe repair sealant.

8. The repair kit of claim 7, wherein the sponge applicator brush includes markings for determining a depth of applying the coolant pipe repair sealant within the coolant passage.

9. The repair kit of claim 1, wherein a length of the repair stent including the cylindrical portion and the flared portion is between 50 and 100 millimeters, wherein a diameter of the cylindrical portion is 32 millimeters.

10. The repair kit of claim 9, wherein the length of the repair stent including the cylindrical portion and the flared portion is 75 millimeters, and wherein a height of the second end of the flared portion is 60 millimeters.

11. The repair kit of claim 9, wherein the length of the repair stent including the cylindrical portion and the flared portion is 60 millimeters, and wherein a height of the second end of the flared portion is 60 millimeters.

12. The repair kit of claim 9, wherein the repair stent is formed from a flexible material.

13. The repair kit of claim 9, wherein the repair stent is a rigid metal repair stent, wherein the flared portion is machined or cast to conform to a shape of the expansion of the coolant passage.

14. A repair kit for use in repairing an engine by stopping a coolant leak, the repair kit comprising:
a repair stent having a cylindrical portion sized to fit within a coolant passage of the engine and a flared portion contiguous at a first end of the flared portion with a first end of the cylindrical portion and shaped to match an expansion of the coolant passage along an extent of the flared portion toward a second end of the flared portion, wherein the flared portion has a first partial cylindrical profile that extends a profile of the cylindrical portion axially along a portion of a length of the flared portion and a second expanding profile along which the flared portion expands in cross-sectional area toward the second end of the flared portion, wherein the repair stent is a rigid metal repair stent, wherein the flared portion is machined or cast to conform to a shape of the expansion of the coolant passage, wherein a length of the repair stent including the cylindrical portion and the flared portion is between 50 and 100 millimeters, wherein a diameter of the cylindrical portion is 32 millimeters; and
a package of coolant pipe repair sealant for affixing the repair stent within the coolant passage.

15. The repair kit of claim 14, wherein the length of the repair stent including the cylindrical portion and the flared portion is 75 millimeters, and wherein a height of the second end of the flared portion is 60 millimeters.

16. The repair kit of claim 14, wherein the length of the repair stent including the cylindrical portion and the flared portion is 60 millimeters, and wherein a height of the second end of the flared portion is 60 millimeters.

17. A method of repairing an engine by stopping a coolant leak due to a defective seal of the engine, the method comprising:
draining coolant from the engine, wherein the engine includes an engine block, a timing cover attached to the engine block through which a timing cover coolant passage is provided, a water pump, and wherein the timing cover coolant passage abuts an engine block coolant passage that extends into the engine block;
removing the water pump from the engine without removing the timing cover and without removing an intake manifold of the engine;
inserting a hollow repair stent and a coolant pipe repair sealant through a front opening of the timing cover coolant passage to stop the coolant leak, wherein the repair stent has a cylindrical portion sized to fit within the engine block coolant passage and a flared portion contiguous at a first end of the flared portion with a first end of the cylindrical portion and shaped to match an expansion of the timing cover coolant passage along an extent of the flared portion toward a second end of the flared portion, so that the hollow repair stent bridges the connection between the timing cover coolant passage and the engine block coolant passage, and wherein the flared portion has a first partial cylindrical profile that extends a profile of the cylindrical portion axially along a portion of a length of the flared portion and a second expanding profile along which the flared portion expands in cross-sectional area toward the second end of the flared portion;
subsequent to the inserting, re-assembling the water pump to the engine, wherein the hollow repair stent remains installed within the timing cover coolant passage and the engine block coolant passage; and
adding coolant to the engine.

18. An engine repaired by the method of claim 17.

* * * * *